United States Patent [19]

Pariani

[11] Patent Number: 4,540,340
[45] Date of Patent: Sep. 10, 1985

[54] HELICOPTER ROTOR

[75] Inventor: Emilio Pariani, Cardano al Campo, Italy

[73] Assignee: Costruzioni Aeronautiche Giovanii Agusta S.p.A., Italy

[21] Appl. No.: 606,156

[22] Filed: May 2, 1984

[30] Foreign Application Priority Data

May 5, 1983 [IT] Italy .............................. 67487 A/83

[51] Int. Cl.³ .......................................... B64C 27/32
[52] U.S. Cl. ................... 416/145; 416/134 A; 416/140; 416/500
[58] Field of Search ............... 416/144, 145, 134 A, 416/140 A, 138 A, 141, 500

[56] References Cited

U.S. PATENT DOCUMENTS

| 2,451,541 | 10/1948 | Doman | 416/145 |
|---|---|---|---|
| 2,531,598 | 11/1950 | Avery | 416/144 X |
| 2,552,727 | 5/1951 | Lightfoot | 416/144 X |
| 2,715,446 | 8/1955 | Felt | 416/145 |
| 2,934,151 | 4/1960 | Jenney | 416/138 A X |
| 3,778,189 | 12/1973 | Ferris | 416/134 A X |
| 3,853,426 | 12/1974 | Rybicki | 416/140 A |
| 3,999,888 | 12/1976 | Zincone | 416/145 |
| 4,239,455 | 12/1980 | Broekhuizen et al. | 416/145 |

FOREIGN PATENT DOCUMENTS

| 481045 | 2/1952 | Canada | 416/144 |
|---|---|---|---|
| 576665 | 5/1933 | Fed. Rep. of Germany | 416/144 |

Primary Examiner—Everette A. Powell, Jr.
Attorney, Agent, or Firm—Kane, Dalsimer, Kane, Sullivan and Kurucz

[57] ABSTRACT

Helicopter rotor on which static balancing of the rotor is provided for by a number of annular-shaped counterweights housed inside each pin securing each blade to the hub; the said counterweights being supported by a rod pressed an clicked inside an axial hole on the relative pin.

3 Claims, 1 Drawing Figure

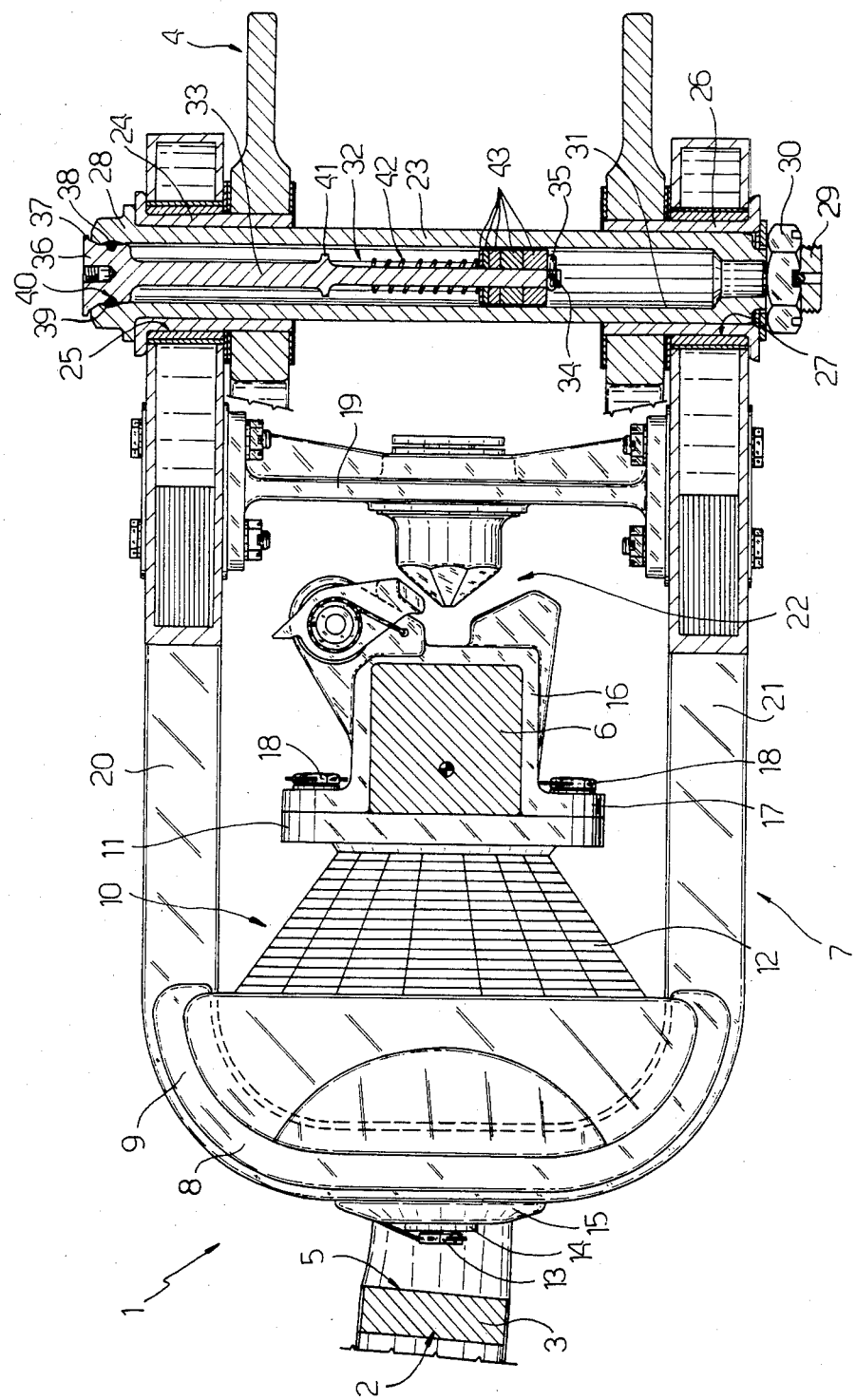

HELICOPTER ROTOR

BACKGROUND OF THE INVENTION

The present invention relates to a helicopter rotor, in particular, a helicopter rotor comprising a centre hub, a number of blades extending radially outwards from the said hub and a fork connecting each blade to the hub. Each said fork generally comprises a pair of pins which normally perform the dual function of connecting together the said fork and relative blade and of housing a device for static balancing of the relative rotor.

On known types of rotors, static balancing of the rotor is normally assured by inserting a variable number of lead pellets inside a dead axial hole on each of the said pins. Alternatively, each said hole is inserted with what might be described as strings of variable length formed of spheres or other metal bodies. After a long series of adjustments, the masses inserted inside each of the said pins are such as to maintain the rotor perfectly horizontal when hung from a centre wire.

The abovementioned known method and means of static balancing rotors entail a number of drawbacks, usually due to the difficulty encountered in extracting the counterweights from the pins during adjustment. When using lead pellets, in fact, adjusting the mass of pellets used often entails extracting and tipping up the pins, whereas, when using the said strings, the latter are extracted using long pliers, usually with the operator in a highly dangerous position over the rotor hanging on the said wire.

SUMMARY OF THE INVENTION

The aim of the present invention is to provide a rotor which can be statically balanced easily and quickly with no need for special implements. With these aims in view, the present invention relates to a helicopter rotor comprising a centre hub, a number of blades extending radially outwards from the said hub, a number of pins connecting the said blades to the said forks and means for static balancing of the said rotor, characterised by the fact that the said balancing means are housed inside each said pin and comprise, for each said pin, a rod, fitted inside an axial hole on the said pin, and a variable number of annular-shaped counterweights fitted in sliding manner on to the said rod; the said counterweights being selected from a number of counterweights of different mass and first and second clamping means being provided for clamping respectively the said counterweights axially on to the said rod and the latter inside the relative pin.

BRIEF DESCRIPTION OF THE DRAWING

Further characteristics and advantages of the present invention will now be described with reference to the attached drawing showing a part section of a preferred arrangement.

DETAILED DESCRIPTION OF THE INVENTION

Number 1 on the attached drawing indicates a helicopter rotor comprising a centre hub (2) consisting of an essentially flat plate (3) preferably made using laminated fibre-reinforced synthetic resin and fitted with blades (4) extending radially outwards from the plate (3) itself. Plate 3 has a number of openings (5) evenly distributed round the axis of rotation of hub 2 and each closed outwardly by a relative bridge element (6) extending along the edge of plate 3 and designed to enable connection of a relative blade (4).

Each blade (4) is connected to its relative bridge element (6) by an essentially U-shaped fork (7) arranged on hub 2 with its concave side facing radially outwards and extending through a relative opening (5) so as to enclose the relative bridge element (6).

The concave surface of a curved portion (8) of fork 7 is fitted contacting an inner shoe (9) of an elastomer support (10) comprising an outer shoe (11) and intermediate taper pad (12) made of elastomer reinforced with metal inserts not shown.

Curved portion 8 and shoe 9 are connected by a centre bolt (13) fitted inside a flanged bush (14) extending through curved portion 8 and shoe 9 and resting on the convex surface of curved portion 8 with a washer (15) inbetween.

Shoe 11 is arranged contacting the inner surface of the relative bridge element (6) to which it is connected by means of a U-bracket (16). The latter is mounted on bridge element 6 with its concave side facing radially inwards and has a flange (17) arranged contacting the edge of shoe 11 and connected to it by means of screws 18. Outside the relative bridge element (6), each fork (7) is provided with a wall (19) connecting two opposite arms (20, 21) on fork 7 and supporting, together with bracket 16, a device (22) for static support and limiting dynamic oscillation on the relative blade (4) in the vertical plane.

The free ends of arms 20 and 21 on each fork 7 are connected by two pins (23) each of which engages a bush (24) fitted through a hole (25) in arm 20 and a bush (26) fitted through a hole (27) through arm 21 and coaxial with the relative hole 25. Each pin 23 has a head (28), on one end, resting on one end of the relative bush 24 and, on the other end, a threaded axial piece (29) projecting from the relative bush 26 and engaged by nut 30. Each pin 23 on each blade 4 has an axial hole (31) housing a device (32) for static balancing of rotor 1. Device 32 comprises a rod (33) fitted from the top inside the relative hole (31) and having, at the bottom end, a diametrical hole (34) for a cotter pin (35). At the top end, rod 33 has an essentially cylindrical head (36) provided with a top outer flange (37) and engaged in sliding manner inside hole 31. The connection between the side surface of head 36 and the surface of hole 31 is made stable by an annular seal (38) housed inside an annular groove (39) round head 36. Seal 38 is made of resilient material and juts out of groove 39 for engaging an annular groove (40) on the inner surface of hole 31. Rod 33 also has an intermediate flange (41) which acts as an abutment for a helical spring (42) mounted on rod 33 between flange 41 and cotter pin 35 and designed to force against the latter a variable number of annular counterweights (43) which may differ from one another as to mass and which are selected from a given number of counterweights of varying mass. To ensure the stability of counterweights 43 inside hole 31, the outside diameter of counterweights 43 is slightly smaller than the inside diameter of hole 31. Device 32 enables the operator to perform static balancing of rotor 1 quickly and easily. Once the rotor has been hung on to a centre supporting wire and static offbalance on the rotor (1) has been determined, all the operator is required to do is pull one or more rods (33) out of holes 31, remove the cotter pin (35) and either assemble or remove counterweights 43 until the required balancing mass is obtained.

Then, after assembling cotter pin 35, rods 33 are replaced inside holes 31 by simply exerting enough axial pressure to force seals 38 inside holes 31 and then into grooves 40.

I claim:

1. A helicopter rotor comprising a central hub, at least one blade extending radially outward from said hub, means for connecting said blade to said hub, and means for static balancing said rotor;

said connecting means comprising a number of pins extending through an inner end portion of said blade, at least one of said pins being hollow and having an axial hole, and said balancing means being housed inside said hollow pin and comprising a rod fitted inside said axial hole, and a variable number of annular counterweights slidably mounted on said rod;

said counterweights being selected from a number of counterweights of different mass, and first and second clamping means being provided for releasably clamping said counterweights axially on to said rod and said rod inside said hollow pin respectively.

2. Rotor according to claim 1, characterised by the fact that the said first clamping means comprise a flange (41), projecting from an intermediate portion of the said rod (33), a cotter pin (35), fitted through the said rod (33), and elastic means (42) fitted on to the said rod (33) and compressed between the said flange (41) and the relative said counterweights (43) so as to force the latter against the said cotter pin (35).

3. Rotor according to claim 1, characterised by the fact that the said second clamping means comprise an essentially cylindrical head (36), integral with one end of the said rod (33) and engaged in sliding manner inside the said hole (31) on the relative said pin (23), and a flexible seal (38) engaged inside an annular groove (39) on the said head (36) and jutting out radially from it so as to engage a further annular groove (40) on the surface of the relative said hole (31).

* * * * *

UNITED STATES PATENT AND TRADEMARK OFFICE
CERTIFICATE OF CORRECTION

PATENT NO. : 4,540,340
DATED : September 10, 1985
INVENTOR(S) : Emilio Pariani

It is certified that error appears in the above-identified patent and that said Letters Patent is hereby corrected as shown below:

Assignee: "Costruzioni aeronautiche Giovanii Agusta S.p.A."

should be

--Costruzioni Aeronautiche Giovanni Agusta S.p.A.--.

Signed and Sealed this

Twenty-first Day of January 1986

[SEAL]

Attest:

DONALD J. QUIGG

Attesting Officer

Commissioner of Patents and Trademarks